A. M. Rodgers,
Canopy.
No. 101,165. Patented Mar. 22. 1870.
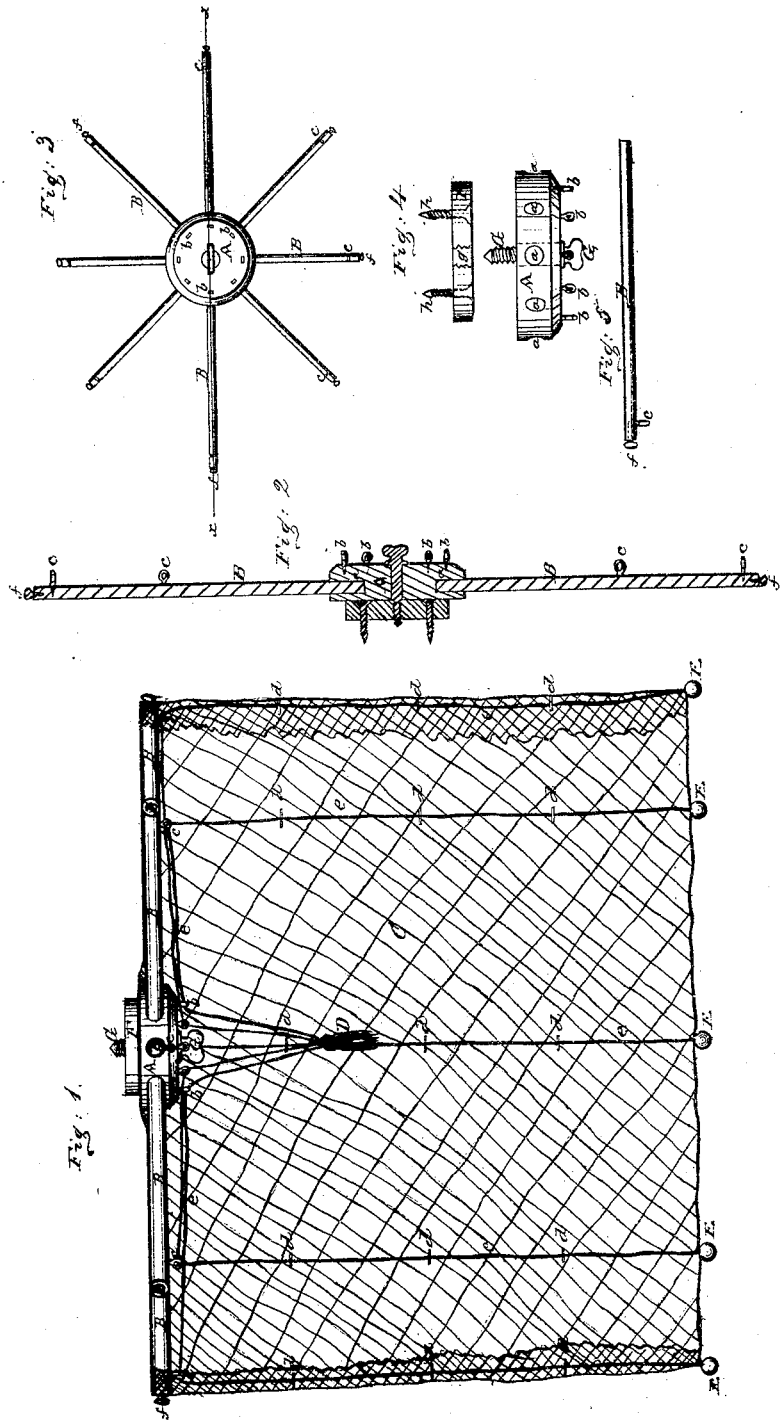
Witnesses:
Chas. Huber
Wm. J. Peyton
Inventor:
A. M. Rodgers
by John A. Wiedersheim
Atty.

United States Patent Office.

AUGUSTA M. RODGERS, OF BROOKLYN, NEW YORK.

Letters Patent No. 101,165, dated March 22, 1870.

IMPROVED CANOPY FOR BEDSTEADS.

The Schedule referred to in these Letters Patent and making part of the same.

*To all whom it may concern:*

Be it known that I, AUGUSTA M. RODGERS, of the city of Brooklyn, in the county of Kings and State of New York, have invented a new and useful Improvement in Canopies; and I do hereby declare the following to be a full and correct description of the same, sufficient to enable others skilled in the art to which my invention appertains to fully understand and use the same, reference being had to the accompanying drawings which make part of this specification, and in which—

Figure 1 is an elevation of my improved canopy;
Figure 2 is a sectional view in line x x, fig. 3;
Figure 3 is a top view of the frame supporting the net-work; and
Figures 4 and 5 are detached views of parts of the same.

Like letters of reference indicate like parts in the several figures.

My invention is an improvement on the canopy for which letters patent were granted to me on the 11th day of May, 1869; and It consists in the arrangement on the disk to which the arms are secured of a series of guiding-loops, rings, or equivalent devices, so that the cords which lift the net will be united at one point and drawn simultaneously.

It also consists in combining therewith a disk which is to be permanently secured to the ceiling.

It finally consists in a combination of various parts, as will be hereinafter more fully described.

In the drawings—

A represents a disk, having a suitable number of holes, *a*, in its periphery, and an equal number of guide-rings or loops, *b*, screwed into or otherwise suitably attached to the lower surface of disk A, in position corresponding to the holes *a*.

Radial arms B are fitted to enter the holes *a*, and are provided at the under side of their outer ends with guide-rings or loops *c*, directly under which the net C is provided with perpendicular rows of similar guide-rings or loops *d*, secured to the sides of the net.

Lifting-cords *e* are attached to the bottom of the skirt, one under each row of guide-rings *d*, and are passed through the latter and guide-rings *c b*, thus coming together at the disk A at the center of the canopy, where they may be suitably united and ornamented by a tassel, D, or other ornamental pendant, which, when the skirt is raised, may be fastened to a bed-post or some other fixture provided for that purpose, thus retaining the skirt of the net in an elevated position until again lowered.

To insure the ready dropping of the skirt, weights E are attached to its bottom at each lifting-cord.

The skirt is secured to the ends of the radial arms by buttons *f* passing through the net into the ends of the arms, thus not only more firmly holding it than the hooks I used in my former patent, but also tearing the net less easily than those hooks.

In fig. 4 I have shown a disk, F, having a central screw-hole, *g*, into which passes the screw G of the disk A.

The disk F is permanently secured to the ceiling by means of screws *h*, and the net, having been passed over the frame, the screw G is passed through disk A and the top of the net into the hole *g* of disk F, thus securely holding the entire net and frame in an elevated position.

By my improved construction and arrangement I am enabled to gather the skirt at the top, in raising it, much neater and with less trouble, having to fasten but one cord instead of two. I can also much more readily remove any one or more of the radial arms, without being obliged to take the entire device apart.

In some cases it may be desirable to employ a cord and pulley, or equivalent devices, for raising, lowering, and supporting the canopy. The fixed disk and central screw would then be rendered unnecessary.

Having thus described my invention,

What I claim as new, and desire to secure by Letters Patent, is—

1. The disk A, provided with the series of guides *b*, so arranged as to unite the lifting-cord centrally at one point, substantially as described.

2. In combination therewith, the permanently fixed disk F, applied and operating as described.

3. The disk A, having peripheral openings *a*, the guides *b*, arms B, buttons *f*, screw G, lifting-cord *e*, and skirt C, combined and operating together substantially as and for the purpose described.

To the above I have signed my name this 8th day of January, 1870.

A. M. RODGERS.

Witnesses:
GLADSTONE K. COMBS,
JOHN A. WIEDERSHEIM.